United States Patent [19]

Takeya et al.

[11] Patent Number: 4,967,466
[45] Date of Patent: Nov. 6, 1990

[54] METHOD FOR PRODUCING MAGNETIC HEAD CORE

[75] Inventors: Fuminori Takeya; Shinya Aoki, both of Nagoya; Shinzi Iida, Haguri, all of Japan

[73] Assignee: NGK Insulators, Ltd., Japan

[21] Appl. No.: 330,894

[22] Filed: Mar. 31, 1989

[30] Foreign Application Priority Data

Mar. 31, 1988 [JP] Japan .................................. 63-80135

[51] Int. Cl.$^5$ ............................................... G11B 5/42
[52] U.S. Cl. ...................................... 29/603; 360/120; 360/127
[58] Field of Search ................. 29/603; 360/119-121, 360/125-127

[56] References Cited

U.S. PATENT DOCUMENTS

| | | | |
|---|---|---|---|
| 3,624,897 | 12/1971 | Reade et al. | 29/603 |
| 3,634,933 | 1/1972 | Hanak | 29/603 |
| 3,672,045 | 6/1972 | Robertson | 29/603 |
| 3,688,056 | 8/1972 | Wisely et al. | 29/603 X |
| 4,675,988 | 6/1987 | Matsuzawa | 29/603 |
| 4,711,018 | 12/1987 | Matsuzawa | 29/603 |

*Primary Examiner*—Carl E. Hall
*Attorney, Agent, or Firm*—Arnold, White & Durkee

[57] ABSTRACT

A magnetic head core having a generally annular structure with an inner coil-winding aperture, and a magnetic gap which has a predetermined width and which is formed so as to extend in a direction across the annulus of the annular structure. The annular structure is formed by a plurality of ferrite core elements bonded together by direct solid-solid reaction bonding, with a non-magnetic layer of SiO or $SiO_2$ interposed between two opposed portions of the ferrite core elements which define the magnetic gap. The non-magnetic layer defines the width of the magnetic gap.

9 Claims, 3 Drawing Sheets

METHOD FOR PRODUCING MAGNETIC HEAD CORE

BACKGROUND OF THE INVENTION

Field of the Invention

The present invention relates to a core of a magnetic head for writing, reading and erasing information in video tape recorders, magnetic disk drives and other information recording and reproduction apparatus, and a method for producing such a magnetic head core. More particularly, the invention is concerned with an improved magnetic head core made of a ferrite material, which provides increased bonding strength at the bonded interface of two ferrite core elements and which has a magnetic head gap whose width is accurately controlled during manufacture.

Discussion of the Prior Art

In the art of magnetic heads used with various types of data storage media, there has been known a core made of ferrite, which generally has a pair of ferrite core elements butted and joined together so as to form a toroidal or doughnut-shaped core having a centrally located aperture or space, which facilitates or permits winding of coils around the core elements. More specifically described referring to FIG. 1 showing a typical known type of magnetic head core, a pair of generally C-shaped ferrite core halves or elements 2, 4 are butted together to form a core with a central aperture 6 which serves as a space for winding coils 8 around the core elements 2, 4. Thus, the two ferrite core elements 2, 4 cooperate with each other to constitute a generally annular or toroidal magnetic path or circuit. The toroidal magnetic head core structure has a magnetic gap 10 formed so as to extend across the annulus or torus of the core or magnetic path. The magnetic gap 10 has a predetermined suitable width $\alpha$ which is a distance between the opposed end faces of the joined core halves 2, 4 at their corresponding ends. As is well known in the art, a magnetic tape 12, magnetic disk or other magnetic recording medium is slidably moved on the outer contact surface formed on a portion of the magnetic head core 2, 4 in which the magnetic gap 10 is formed. Thus, information is written or recorded on and read or retrieved from the recording medium, through the magnetic head core.

As indicated above, one of the opposite ends of the ferrite core element 2 is spaced apart from the corresponding end of the other ferrite core element 4, by a distance equal to the width $\alpha$ of the magnetic gap 10, while the other corresponding ends of the core elements 2, 4 are bonded together with a suitable bonding glass, as indicated at 14 in FIG. 1, such that the two core elements 2, 4 maintain the generally annular or doughnut-like cross sectional configuration to provide a generally toroidal magnetic circuit.

In the known ferrite magnetic head core wherein the core elements 2, 4 are bonded together with a glass, the bonding strength at the bonded portion 14 is not sufficiently high, and the head core 2, 4 may be broken or otherwise damaged at the bonded portion 14 in the subsequent steps of manufacture, for example, in the process of winding the coils 8 around the core elements 2, 4.

The magnetic head core is further subjected to heat treatments for various purposes, including a heat treatment for filling the magnetic gap 10 with a glass filler. During the heat treatments, the glass material at the bonded portion 14 may be softened. This means a potential problem that the width $\alpha$ of the magnetic gap 10 may deviate from the predetermined nominal value To prevent this problem, the bonding glass for the bonded portion 14 and the glass filler should have different softening points.

Usually, the bonding of the two ferrite core halves or elements 2, 4 as used in the head core of FIG. 1 is conducted by using a fixture as illustrated in FIG. 2. Namely, the butted two core elements 2, 4 are held in position on the fixture, and suitable bonding glass and glass filler 16 are applied to the bonding surfaces 14 and a magnetic gap portion 18 of the butted core elements 2, 4. If the pressure is not evenly exerted to the bonding surfaces 14 of the butted core elements 2, 4, the width of the magentic gap 10 obtained may significantly fluctuate with respect to the predetermined optimum value.

In an attempt to solve the above-indicated potential problem experienced in the prior art, the assignee of the present application proposed a magnetic head core and a method for producing the same, as disclosed in laid-open Publication No. 60-138710 (published in 1985) of unexamined Japanese patent application. According to the proposed head core and method, a generally annular ferrite core structure is formed by a plurality of ferrite core elements which are bonded together by direct solid-solid reaction bonding at a portion of the structure remote from the magnetic gap portion.

The method proposed in the above-identified Publication is schematically illustrated in FIG. 3, wherein a first ferrite core element 22 as one of two elements of the head core to be produced is subjected to a process of forming a groove 26 and a recess 28 such that the groove 26 and the recess 28 define therebetween a gap-defining surface 30. This gap-defining surface 30 is then chemically etched to a suitable depth 8 corresponding to the desired width $\alpha$ of the magnetic gap to be obtained. The thus prepared first ferrite core element 22 and a second ferrite core element 24 are butted together such that the etched gap-defining surface 30 of the first core element 22 is spaced apart from the corresponding surface of the second core element 24, by a distance equal to the magnetic gap width $\alpha$ (etching depth $\beta$). The two core elements 22, 24 are bonded together at the corresponding end portions remote from the gap-defining surface 30, by means of direct solid-solid reaction bonding Thus, an integral ferrite structure 32 consisting of the bonded ferrite core elements 22, 24 is obtained. The ferrite structure 32 has a magnetic gap 36 filled with a glass filler 38, and a coil-winding aperture 34 defined by the recess 28 of the first core element 22 and the corresponding surface of the second core element 24. The ferrite structure 32 is then subjected to an operation to remove its end portion remote from the bonded ends of the core elements 22, 24, so that the magnetic gap 36 filled with the glass filler 38 is exposed to a suitably formed outer contact surface 42. In this manner, a ferrite head core 40 is prepared.

For effecting the solid-solid reaction bonding, the two ferrite core elements 22, 24 are heated to a relatively high temperature of about 1100°-1250° C., according to the above-identified Publication. During this heating process for the solid-solid reaction bonding, not only the outer surfaces of the ferrite core elements 22, 24 but also the inner surfaces defining the magnetic gap width $\alpha$ are subjected to evaporation of zinc of the ferrite and oxidation-reduction reaction, due to an oxygen partial pressure of an atmosphere surrounding the ferrite core elements. As a result, the width α of the magnetic gap 36 may have an error of ±0.1 micron or more with respect to the nominal value.

Recently, there is a tendency toward increased data storage density per unit area of a recording medium. This tendency requires the magnetic head core to have an accordingly reduced magnetic gap width and accordingly improved accuracy of the gap width. For example, the currently available VTR magnetic head core requires the magnetic gap width of 0.4 micron with a permissible error of ±0.03 micron, and the RDD (rigid magnetic disk drive) magnetic head core requires the magnetic gap width of 0.8 micron with a permissible error of ±0.08 micron.

SUMMARY OF THE INVENTION

It is therefore a first object of the present invention to provide a magnetic head core which is formed by a plurality of ferrite core elements bonded together so as to form a generally annular ferrite structure, and which has increased strength of bonding of the core elements and enhanced accuracy of the magnetic gap width, for assuring excellent operating characteristics and stability.

The above object may be attained according to one aspect of the present invention, which provides a magnetic head core having a generally annular structure with an inner coil-winding aperture, and a magnetic gap which has a predetermined width and which is formed so as to extend in a direction across the annulus of the annular structure, wherein the improvement comprises a plurality of ferrite core elements bonded together so as to provide the generally annular structure, and a non-magnetic layer of SiO or $SiO_2$ which is interposed between two opposed portions of the ferrite core elements defining the magnetic gap. The two ferrite core elements having the above-indicated two opposed portions are bonded together by direct solid-solid reaction bonding, with the non-magnetic layer being interposed between the above-indicated two opposed portions.

In the magnetic head core of the present invention constructed as described above, the width of the magnetic gap is controlled or determined solely by the thickness of the non-magnetic layer of SiO or $SiO_2$ interposed between the surfaces of the appropriate two core elements. Namely, the width of the magnetic gap will not be varied due to an influence of the oxygen partial pressure of the surrounding atmosphere on the gap-defining surfaces of the two ferrite core elements. This is due to the solid-solid reaction bonding of these gap-defining surfaces which occurs via the non-magnetic layer, which is formed on one of the two core elements prior to the bonding, by suitable known technique such as sputtering or vapor deposition. Since the thickness of the non-magnetic layer can be comparatively accurately controlled during sputtering, vapor deposition or other suitable process, the width of the magnetic gap can accordingly be accurately controlled, according to the principle of the present invention.

Further, the ferrite core elements are bonded by direct solid-solid reaction bonding also at the appropriate portion or portions of the annular ferrite structure other than the magnetic gap portion, without a bonding glass. Therefore, the instant magnetic head core is free from damage of the bonded portion and variation in the gap width, which are unavoidably experienced on the conventional magnetic head core wherein the core elements are bonded together by a glass material.

The solid-solid reaction bonding of the ferrite core elements at the portion or portions of the ferrite structure other than the magnetic gap portion is effected without a gap between the core elements over the entire length of the bonded portion or portions in the direction parallel to the direction of extension of the magnetic gap, since the solid-solid reaction bonding involves shrinkage of the ferrite structure. Consequently, the opposed gap-defining surfaces of the two core elements are bonded together via the non-magnetic layer, with a constant spacing therebetween which is equal to the thickness of the non-magnetic layer. That is, the width of the magnetic gap can be made constant over the entire length of the magnetic gap. In this respect, too, the instant magnetic head core is improved over the conventional magnetic head core whose core elements are glass-bonded by using a fixture as illustrated in FIG. 2, wherein the uneven pressure distribution on the bonding surfaces at the bonded portion 14 is likely to cause a variation in the width of the magnetic gap in the direction parallel to the plane of the bonding interface of the core elements.

A second object of the present invention is to provide a method suitable for producing the magnetic head core described above. The method according to the invention comprises: preparing a plurality of ferrite core elements which have two opposed portions which define the magnetic gap therebetween; providing one of the two opposed portions of the ferrite core elements with a non-magnetic layer; butting together the plurality of ferrite core elements such that the non-magnetic layer is interposed between the two opposed portions; and heating the plurality of ferrite core elements to directly bond the ferrite core elements by means of a solid-solid reaction, such that the non-magnetic layer between the two opposed portions defines a width of the magnetic gap.

The non-magnetic layer may be formed on a surface of one of the two opposed portions of the ferrite core elements, before the ferrite core elements are butted together. Alternatively, the non-magnetic layer is embedded in a recess formed in a surface of one of the two opposed portions of the ferrite core elements, before the ferrite core elements are butted together The non-magnetic layer is embedded such that the non-magnetic layer is substantially flush with the surface in which the recess is formed.

The ferrite core elements used according to the present invention may be single crystals of ferrite, or polycrystal ferrite blocks, or alternatively, ferrite blocks consisting of single crystal and polycrystal portions. However, the solid-solid reaction bonding of ferrite elements of single crystals is difficult since the single crystal ferrite has a low degree of activity at its surface at an elevated firing temperature. In this sense, it is desirable that at least one of the butted or bonded portions of the two ferrite core elements has a polycrystal structure, in order to assure excellent solid-solid reaction bonding.

It is preferred that the abutting surfaces of the two core elements are chemically treated by hydrochloric acid, nitric acid, sulfuric acid or other acids capable of dissoving the ferrite, before the core elements are butted together. In this case, the two core elements are first tentatively fixed together with such an acid applied to the abutting surfaces, heated to an elevated temperature of 850°–1200° C. and held at this temperature for a suitable length of time, for attaining the solid-solid reaction bonding.

The acid applied to the abutting surfaces of the two ferrite core elements serves two different functions as described below. The first function of the acid is to produce a salt of the ferrite composition e.g., iron nitrate, manganese nitrate, zinc nitrate) by which the two ferrite core elements are secured to each other. The second function is to promote the solid-solid reaction bonding of the ferrite, in the presence of oxides which are produced as a result of decomposition of the salt at the elevated temperature. Similar functions may be attained by an aqueous solution of inorganic acid salts containing the ferrite composition.

For the solid-solid reaction bonding according to the present invention, it is desirable that the ferrite core elements be maintained at a temperature between 850° C. and 1200° C. Below the lower limit of 850° C., the diffusion of the substances necessary to induce the solid-solid reaction is not sufficiently active. Above the upper limit of 1200° C., on the other hand, the non-magnetic layer of SiO or SiO$_2$ defining the magnetic gap tends to suffer from transformation in phase, cracking or other inconveniences that lead to lowering the operating reliability of the magnetic gap.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 3:
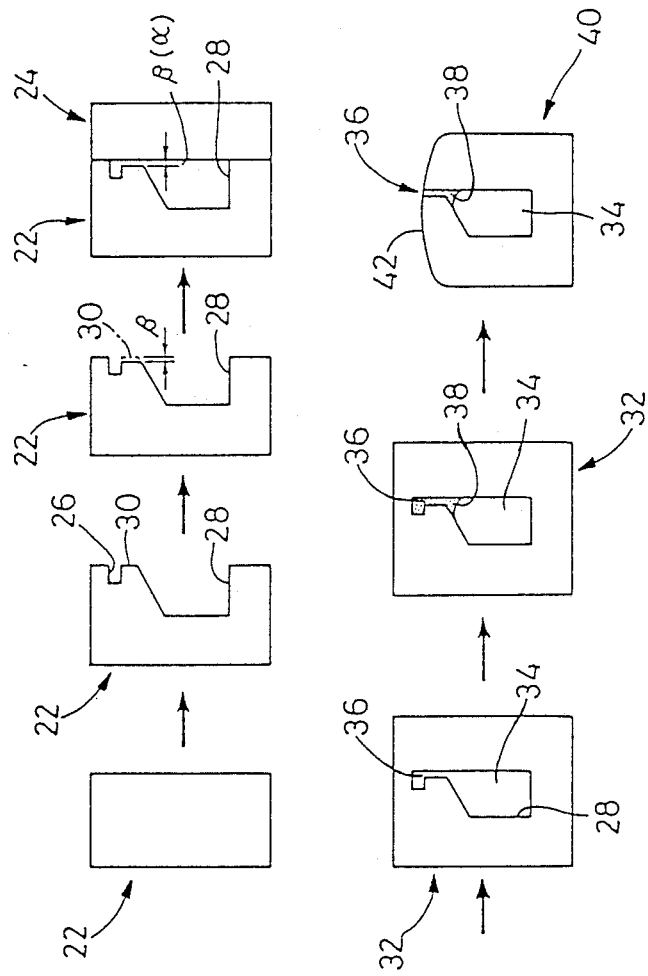
FIG. 3 is an explanatory view illustrating a series of steps for preparing a magnetic head core, utilizing a conventional solid-solid reaction bonding technique.
Figures 4A, 4B:
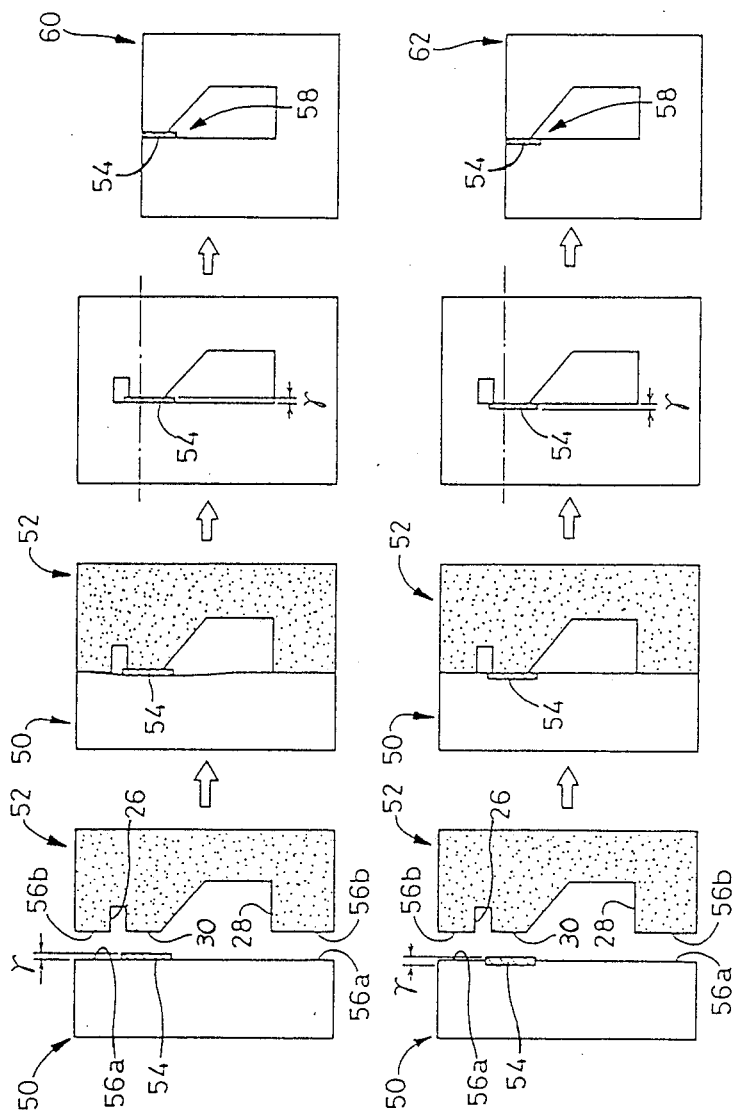
FIG. 4(a) is a schematic elevational view showing a manner of bonding ferrite core elements according to one embodiment of the present invention.
FIG. 4(b) is a schematic elevational view showing a manner of bonding ferrite core elements according to another embodiment of the invention.

FIGS. 4(a) and 4(b) illustrate two preferred forms of a magnetic head core generally indicated at 60 and 62, which include a non-magnetic layer made of SiO or SiO$_2$. In each form of the magnetic head core 60, 62, a first ferrite core element 50 of a single crystal and a polycrystal second ferrite core element 52 are bonded together by means of direct solid-solid reaction bonding, in a manner which will be described. In FIGS. 4(a) and 4(b), groove, recess and gap-defining portion of the second ferrite core elements 52 are indicated by reference numerals 26, 28 and 30 which are used in FIG. 3 with respect to the first core element 22.

Figure 1:
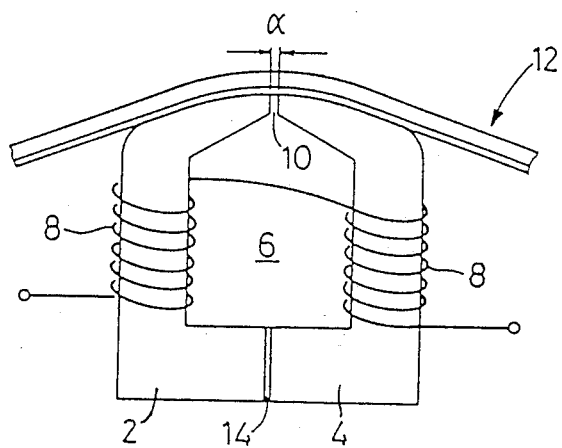
FIG. 1 is a schematic elevational view of a known magnetic head.
Figure 2:
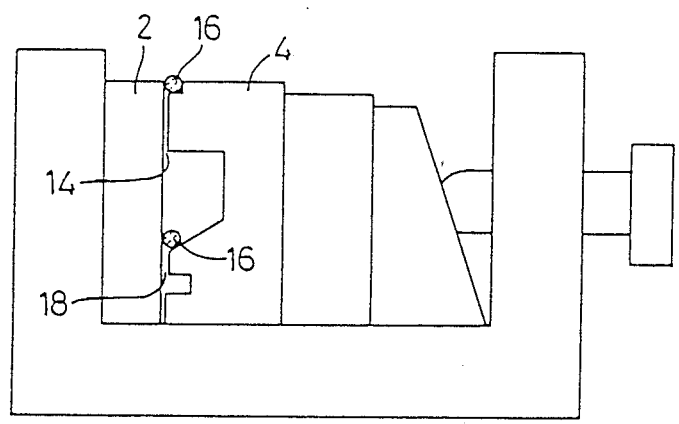
FIG. 2 is an elevational illustrative view of a fixture used to bond two ferrite core elements with a glass material to prepare a known magnetic head core.

The ferrite core 60 shown in FIG. 4(a) is produced by first forming a non-magnetic layer 54 of SiO or SiO$_2$ with a suitable thickness $\gamma$ on a gap-defining portion of an abutting surface 56a of the single crystal first ferrite core element 50, such that the non-magnetic layer 54 protrudes from the surface 56a and is aligned with the gap-defining portion 30 of the second ferrite core element 52. A selected acid indicated above is applied to the mutually abutting surfaces 56a, 56b of the first and second ferrite core elements 50, 52, before the core elements are butted together at their corresponding end portions and at the non-magnetic layer 54. In this condition, the two core elements 50, 52 are subjected to a solid-solid reaction bonding at a selected temperature, as described above. In the present case, wherein the non-magnetic layer 54 is formed on the surface 56a of the first ferrite core element 50, the bonding interface is more or less deflected in the presence of the non-magnetic layer 54. Where the thickness Y of the non-magnetic layer 54 is relatively small, the above-indicated acid is sufficiently effective to tentatively hold the two core elements 50, 52 in fixed relation with each other at the butted portions until the core elements 50, 52 are heated to a temperature at which the solid-solid reaction occurs. Where the thickness $\gamma$ is relatively large, however, it is desirable to use a fixture or jig as shown in FIG. 2, for holding the two core elements 50, 52 in pressed abutting contact with each other, until the solid-solid reaction bonding is completed.

In the embodiment of FIG. 4(b), the non-magnetic layer 54 is embedded in the gap-defining portion of the abutting surface 56a of the first ferrite core element 50, before the first and second ferrite core elements 50, 52 are butted together and solid-solid reaction bonded together. In this case wherein the non-magnetic layer 54 is substantially flush with the abutting surface 56a and the bonding interface is straight, the acid applied to the abutting surfaces 56a, 56b is sufficiently effective to tentatively hold the two core elements 50, 52 in fixed relation with each other, irrespective of the thickness of the non-magnetic layer 54, until the solid-solid reaction occurs at the appropriate elevated temperature. Accordingly, the present embodiment eliminates the use of a fixture as shown in FIG. 2, and a time and effort for setting the core elements 50, 52 on the fixture.

In the second embodiment of FIG. 4(b) wherein the non-magnetic layer 54 is embedded in the gap-defining portion of the first ferrite core element 50, a recess having a depth equal to or slightly smaller than the thickness of the non-magnetic layer 54 (width of the magnetic gap) is formed in the gap-defining portion of the mirror-polished abutting surface 56a, by a suitable known technique such as machining, chemical etching or ion-beam etching. The non-magnetic layer 54 is fixedly embedded in the formed recess.

The solid-solid reaction bonding of the two core elements 50, 52 may be accomplished at a relatively low temperature, if a metallic layer is interposed between the abutting surfaces 56a, 56b of the core elements 50, 52, and/or between the non-magnetic layer 54 on the first core element 50 and the gap-defining portion 30 of the second core element 52. The metallic layer is formed by sputtering, vapor deposition or other suitable known technique, of at least one material selected from the group which includes Cr, Ti, Al, Bi, Pb, V, Ni, Co and Fe.

In the magnetic head cores 60, 62 of FIGS. 4(a) and 4(b) prepared according to the present invention, no glass filler exists at an apex portion 58 of the coil-winding aperture adjacent the magnetic gap. The glass filler which exists in the conventional magnetic head core prevents the practice of a laser-induced etching operation for forming tracks on the magnetic head core by utilizing a reaction gas. In other words, the glass filler prevents the removal of stock from the ferrite core structure from the appropriate portions by the laser-induced etching, in order to form the tracks as required. The absence of the glass filler in the instant magnetic head core makes it possible to accurately form the tracks by utilizing the laser-induced etching technique.

EXAMPLE

To show the advantage of the magnetic head core according to the invention, a total of 30 specimens of the magnetic head core 62 of FIG. 4(b) were prepared as described above, and were compared with a total of 30 specimens of the conventional magnetic head core 40 of FIG. 3 which were prepared as a comparative example in the manner described above. Both the specimens according to FIG. 4(b) and the comparative specimens according to FIG. 3 were subjected to a solid-solid reaction bonding with the core elements held at 1150° C. for 30 minutes, in an atmosphere having an oxygen concentration of 500 ppm.

The nominal widths of the magnetic gap in the instant and comparative specimens were 0.40 micron and 0.46 micron, respectively. The actual width of the magnetic gap of each specimen was measured. The measurements indicate a comparatively large variation of ±0.12 micron in the magnetic gap width on the comparative specimens, and a comparatively small gap width variation of ±0.02 micron on the specimens according to the embodiment of FIG. 4(b). Thus, the test shows a considerable improvement of the instant magnetic head core over the conventional magnetic head core, in the accuracy of the magnetic gap width.

It will be understood from the foregoing description that the magnetic head core according to the invention consists of ferrite core elements which are bonded together by direct solid-solid reaction bonding, with sufficient bonding strength, without complicated process steps and fixture or jig.

Further, the width of the magnetic gap of the instant magnetic head core is accurately controlled by the thickness of the non-magnetic layer of SiO or $SiO_2$ which is interposed between the two ferrite core elements In the presence of the non-magnetic layer, the magnetic gap width is neither influenced by the solid-solid reaction of the ferrite, nor changed by the heat treatments effected for purposes other than the solid-solid reaction bonding.

While the present invention has been described above with a certain degree of particularity, it is to be understood that the invention is not limited to the details of the illustrated embodiments and example, but may be embodied with various changes, modifications and improvements, which may occur to those skilled in the art, without departing from the spirit and scope of the invention defined in the following claims.

What is claimed is:

1. A method of producing a magnetic head core having a generally annular structure with an inner coil-winding aperture and a magnetic gap which has a predetermined width, said magnetic gap being formed so as to extend in a direction across the annulus of the annular structure, comprising the steps of:

preparing a plurality of ferrite core elements which have two opposed portions defining said magnetic gap therebetween;

providing one of said two opposed portions of the ferrite core elements with a non-magnetic layer, said non-magnetic layer consisting essentially of SiO or $SiO_2$;

butting together the ferrite core elements such that said non-magnetic layer is interposed between said two opposed portions of the ferrite core elements; and heating the ferrite core elements to a temperature between 850° C. and 1200° C., to directly bond the ferrite core elements by means of solid-state reaction bonding, such that said non-magnetic layer between said two opposed portions of the ferrite core elements defines said predetermined width of said magnetic gap, while preventing an oxidation-reduction reaction of said two opposed portions of the ferrite core elements during the solid-state reaction bonding of said ferrite core elements.

2. A method of producing a magnetic head core having a generally annular structure with an inner coil-winding aperture and a magnetic gap which has a predetermined width, said magnetic gap being formed so as to extend in a direction across the annulus of the annular structure, comprising the steps of:

preparing a plurality of ferrite core elements which have two opposed portions defining said magnetic gap therebetween;

providing one of said two opposed portions of the ferrite core elements with a non-magnetic layer;

butting together the ferrite core elements such that said non-magnetic layer is interposed between said two opposed portions of the ferrite core elements; and heating the ferrite core elements to a temperature between 850° C. and 1200° C. to directly bond the ferrite core elements by means of solid-state reaction bonding, such that said non-magnetic layer between said two opposed portions of the ferrite core elements defines said predetermined width of said magnetic gap, while preventing an oxidation-reduction reaction of said two opposed portions of the ferrite core elements during the solid-state reaction bonding of said ferrite core elements.

3. A method according to claim 2, wherein said step of providing one of said two opposed portions of the ferrite core elements with a non-magnetic layer comprises forming said non-magnetic layer on a surface of said one of said two opposed portions of the ferrite core elements, before the ferrite core elements are butted together.

4. A method according to claim 2, wherein said step of providing one of said two opposed portions of the ferrite core elements with a non-magnetic layer comprises forming a recess in a surface of said one of said two opposed portions of the ferrite core elements, and embedding said non-magnetic layer in said recess, before the ferrite core elements are butted together, said non-magnetic layer being embedded such that said non-magnetic layer is substantially flush with said surface in which said recess is formed.

5. A method according to claim 2, further comprising a step of applying an acid to abutting surfaces of the ferrite core elements, before the ferrite core elements are butted together.

6. A method according to claim 2, further comprising a step of providing a metallic layer on one of abutting surfaces of the two ferrite core elements which have said two opposed portions, before the ferrite core elements are butted together.

7. A method according to claim 2, further comprising a step of providing a metallic layer on one of said non-magnetic layer and a surface of the other of said two opposed portions of the ferrite core elements, before the ferrite core elements are butted together.

8. A method according to claim 2, further comprising a step of providing a metallic layer on one of abutting surfaces of the two ferrite core elements which have said two opposed portions, and on one of said non-magnetic layer and a surface of the other of said two opposed portions of the ferrite core elements, before the ferrite core elements are butted together.

9. A method of producing a magnetic head core having a generally annular structure with an inner coil-winding aperture and a magnetic gap which has a predetermined width, said magnetic gap being formed so as to extend in a direction across the annulus of the annular structure, comprising the steps of:

preparing a plurality of ferrite core elements which have two opposed portions defining said magnetic gap therebetween;

providing one of said two opposed portions of the ferrite core elements with a non-magnetic layer by forming a recess in a surface of said one of said two opposed portions of the ferrite core elements, and embedding said non-magnetic layer in said recess, before the ferrite core elements are butted together, said non-magnetic layer being embedded such that said non-magnetic layer is substantially flush with said surface in which said recess is formed;

butting together the ferrite core elements such that said non-magnetic layer is interposed between said two opposed portions of the ferrite core elements; and heating the ferrite core elements to directly bond the ferrite core elements by means of a solid-solid reaction, such that said non-magnetic layer between said two opposed portions of the ferrite core elements defines a width of said magnetic gap.

* * * * *